US005668973A

United States Patent [19]

Stutz et al.

[11] Patent Number: 5,668,973

[45] Date of Patent: Sep. 16, 1997

[54] PROTECTION SYSTEM FOR CRITICAL MEMORY INFORMATION

[75] Inventors: Peter Stutz, Hinterkappelen; Martin Müller, Langenthal; Daniel Flückiger, Zäziwil, all of Switzerland

[73] Assignee: Ascom Hasler Mailing Systems AG, Bern, Switzerland

[21] Appl. No.: 422,435

[22] Filed: Apr. 14, 1995

[51] Int. Cl.$^6$ ........ G06F 12/16; G06F 13/00

[52] U.S. Cl. ........ 711/152; 364/DIG. 1; 365/189.01; 711/163; 711/164

[58] Field of Search ........ 395/479, 490, 395/491; 365/189.01

[56] References Cited

U.S. PATENT DOCUMENTS

| | | | |
|---|---|---|---|
| 3,827,029 | 7/1974 | Schlotterer et al. | 340/172.5 |
| 4,141,068 | 2/1979 | Mager et al. | 364/200 |
| 4,298,934 | 11/1981 | Fischer | 395/479 |
| 4,376,299 | 3/1983 | Rivest | 364/900 |
| 4,388,695 | 6/1983 | Heinemann | 364/900 |
| 4,489,380 | 12/1984 | Carey et al. | 395/479 |
| 4,493,031 | 1/1985 | Silverio | 395/479 |
| 4,549,273 | 10/1985 | Tin | 395/479 |
| 4,566,106 | 1/1986 | Check, Jr. | 371/67 |
| 4,639,581 | 1/1987 | Berger et al. | 235/101 |
| 4,644,494 | 2/1987 | Muller | 364/900 |
| 4,730,821 | 3/1988 | Flückiger | 270/58 |
| 4,734,851 | 3/1988 | Director | 395/479 |
| 4,802,117 | 1/1989 | Chrosny et al. | 364/900 |
| 4,805,109 | 2/1989 | Kroll | 364/464.02 |
| 4,807,139 | 2/1989 | Liechti | 364/464.02 |
| 4,887,807 | 12/1989 | Berger et al. | 271/171 |
| 5,038,153 | 8/1991 | Liechti et al. | 346/140 |
| 5,060,821 | 10/1991 | Berger et al. | 221/190 |
| 5,097,445 | 3/1992 | Yamauchi | 395/479 |
| 5,163,141 | 11/1992 | Mueller et al. | 395/491 |
| 5,203,263 | 4/1993 | Berger et al. | 101/76 |
| 5,237,506 | 8/1993 | Horbal et al. | 364/464.02 |
| 5,276,844 | 1/1994 | Aebi et al. | 395/425 |
| 5,278,541 | 1/1994 | Wicht et al. | 340/636 |
| 5,301,116 | 4/1994 | Grünig | 364/464.02 |
| 5,340,965 | 8/1994 | Horbal et al. | 235/101 |
| 5,359,273 | 10/1994 | Flückiger | 318/794 |
| 5,363,760 | 11/1994 | Lindenmueller et al. | 101/91 |
| 5,377,264 | 12/1994 | Lee et al. | 395/491 |
| 5,389,863 | 2/1995 | Flückiger | 318/549 |
| 5,396,609 | 3/1995 | Schmidt et al. | 395/490 |
| 5,406,516 | 4/1995 | Ihara et al. | 365/189.01 |

FOREIGN PATENT DOCUMENTS

| | | |
|---|---|---|
| 0062376 | 10/1982 | European Pat. Off. . |
| 0173249 | 3/1986 | European Pat. Off. . |
| 0230658 | 8/1987 | European Pat. Off. . |
| 0512542 | 11/1992 | European Pat. Off. . |
| 0526139 | 2/1993 | European Pat. Off. . |
| 0526140 | 2/1993 | European Pat. Off. . |
| 3421540 | 1/1986 | Germany . |
| 2184692 | 7/1987 | United Kingdom . |
| WO89/11134 | 11/1989 | WIPO . |

OTHER PUBLICATIONS

"Microsoft Press Computer Dictionary" Microsoft Press, 1991, pp. 19 and 160.

*Primary Examiner*—Frank J. Asta
*Attorney, Agent, or Firm*—Oppedahl & Larson

[57] ABSTRACT

A computer system for protecting memory comprising a processor having address outputs and executing a stored program, a memory having a control input, an address-decoder for providing a control signal to the control input of the memory in response to associated address outputs from the processor, and a window circuit. The window circuit comprises a range detector responsive to the address outputs for generating a range-detection signal indicative of an address from the processor being within a protected range, the protected range non-identical to the entirety of the space of addresses within the memory. Access to memory locations within the protected range is permitted only if a request signal is received from the processor. If the request signal is asserted for an unexpectedly long time an error condition is annunciated, for example the processor is reset.

19 Claims, 7 Drawing Sheets

PROTECTION SYSTEM FOR CRITICAL MEMORY INFORMATION

The invention relates generally to protection of important or critical data in memory devices, and relates particularly the protection of such data in postage meters, also called franking machines.

When important information is stored in a computer system it is commonplace to provide security against loss of some or all of the information, for example by making a backup copy of the information. In some systems, however, the information as stored in the system is what must be capable of being relied upon, and the theoretical feasibility of relying on backups is of little or no value. An example of such a system is the electronic postage meter, in which the amount of postage available for printing is stored in a nonvolatile memory. The user should not be able to affect the stored postage data in any way other than reducing it (by printing postage) or increasing it (by authorized resetting activities). Some single stored location must necessarily be relied upon by all parties (the customer, the postal service, and the provider of the meter) as the sole determinant of the value of the amount of postage available for printing. In electronic postage meters that single stored location is the secure physical housing of the meter itself. Within the secure housing one or more items of data in one or more nonvolatile memories serve to determine the amount of postage available for printing.

Experience with modern-day systems employing processors shows that it is advantageous to guard against the possibility of a processor running amok. Generally a processor is expected to execute its stored program and it is assumed the stored program contains no programming errors. Under rare circumstances, however, a processor may commence executing something other than the stored program, such as data. Under other rare circumstances the processor, even though it may be executing the stored program, nonetheless behaves incorrectly due to the incorrect contents of a processor register or a memory location. The former may occur if, for example, the instruction pointer or program counter of the processor changes a bit due to, say, absorption of a cosmic ray. The latter may occur if the contents of the processor register or memory location are changed by that or other mechanisms.

In pragmatic terms it is not possible to prove the correctness of a stored program; testing and debugging of the program serve at best to raise to a relatively high level (but not to certainty) the designer's confidence in the correctness of the code. Nonetheless an unforeseen combination of internal states, or an unforeseen set of inputs, has been known to cause a program that was thought to be fully debugged to proceed erroneously.

For all these reasons in systems where crucial data are stored in what is necessarily a single location under control of a processor running a stored program, it is highly desirable to provide ways to detect a processor running amok and to reduce to a minimum the likelihood of the processor's harming the crucial data. In the particular case of a postage meter, it is desirable that the amount of postage available for printing, also called the descending register, be recoverable by an authorized technician even if the system is completely inoperable from the customer's point of view, even after any of a wide range of possible processor malfunctions.

Numerous measures have been attempted to protect crucial data in such systems as postage meters. In a system having an address decoder providing selection outputs to the various memory devices in the system, it is known to monitor all the selection outputs of the address decoder, and to permit the processor's write strobe to reach certain of the memory devices only if (a) the address decoder has selected one of the certain memory devices, and (b) the address decoder has not selected any memory device other than the certain memory devices.

In another system having an address decoder providing selection outputs to the various memory devices in the system, it is known to monitor the selection outputs associated with certain of the memory devices, and to take a predetermined action if any of the selection outputs is selected for longer than a predetermined interval of time. The predetermined action is to interrupt the write strobe and selection outputs to the certain of the memory devices.

Although these approaches isolate the certain memory devices (typically the devices containing the crucial postage data) upon occurrence of some categories of malfunction, they do little or nothing to cure the malfunction when it is caused by a processor running amok. That is, it is important to distinguish the problems just mentioned from the problem of physical malfunction of a processor or other system component. Simple physical malfunction can be quite rare if conservative design standards are followed and if the system is used in rated ambient conditions, so that the frequency of occurrence of such physical malfunctions can be low. But many of the above-mentioned failure modes are not of a lasting physical nature and, if appropriately cleared, need not give rise to permanent loss of functionality.

Still other approaches may be seen in Appl. Ser. No. 740,427, issued as U.S. Pat. No. 5,276,844 entitled *Protection System for Critical Memory Information*, and in Appl. Ser. No. 08/002,737, both of which are assigned to a corporate predecessor of the assignee of the present invention, and both of which are incorporated herein by reference. Each approach is helpful with respect to the problem of a processor running amok, but has the possible drawback that it will protect a particular memory but only in the entirety, and has the further drawback that the range of addresses being protected is fixed at the time of manufacture. Yet another memory protection arrangement is shown in PCT publication number 89-11134, also assigned to a predecessor of the assignee of the present invention.

It is also well-known to provide "watchdog" circuits in computerized systems. In such a system the code executed by the processor includes periodic issuance of a watchdog signal which serves to clear a watchdog circuit. If an excessive time passes without receipt of the watchdog signal, the watchdog circuit takes protective action such as shutting down the system or resetting the processor. The latter action has the advantage that it may restore normal processor function if, for example, the malfunction was due to a spurious change in the value of the instruction pointer or program counter. But the watchdog circuit only triggers after the passage of a predetermined interval, and processor malfunction could conceivably alter crucial data during the predetermined interval and prior to a watchdog-induced reset. It would be most desirable if crucial data could enjoy more comprehensive safeguards against processor malfunction, with the safeguards implemented in such a way as to permit restoration of proper processor function if possible. It is quite desirable that the system be such that parts of a memory are protected while other parts of the same memory are not, and that the portions of memory to be protected are not completely constrained at the time of manufacture.

SUMMARY OF THE INVENTION

A computer system for protecting memory comprising a processor having address outputs and executing a stored program, a memory having a control input, an address-decoder for providing a control signal to the control input of the memory in response to associated address outputs from the processor, and a window circuit. The window circuit comprises a range detector responsive to the address outputs for generating a range-detection signal indicative of an address from the processor being within a protected range, the protected range non-identical to the entirety of the space of addresses within the memory. Access to memory locations within the protected range is permitted only if a request signal is received from the processor. If the request signal is asserted for an unexpectedly long time an error condition is annunciated, for example the processor is reset.

DESCRIPTION OF THE DRAWING

The invention will be described with respect to a drawing, of which.

Like elements in the figures have, where possible, been shown with like reference designations.

DETAILED DESCRIPTION

Figure 1:
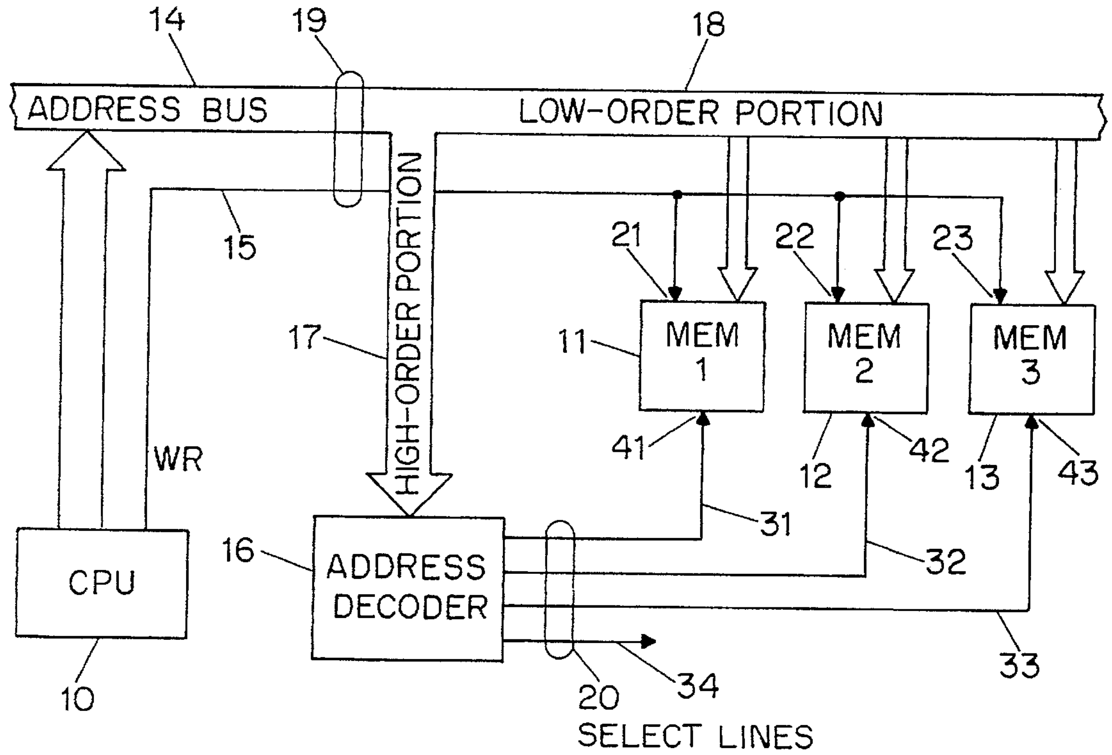
FIG. 1 PRIOR ART
FIGS. 1, 2, 3 and 4 are functional block diagrams of prior art memory addressing systems.

In the typical prior art memory addressing system of FIG. 1, a processor 10 is capable of writing data to memory devices 11, 12, and 13 by means of a system bus 19, of which address bus 14 and write strobe line 15 are shown. Some of the address lines of address bus 14 are provided to a conventional address decoder 16; these so-called "high-order" address lines are shown as the high-order portion 17 of the address bus. The so-called "low-order" portion 18 of the address bus 14 is provided to memory devices 11, 12, and 13, and to other devices in the memory space of processor 10. For clarity the data lines and other control lines of the system bus 19 are omitted from FIG. 1, as are the other devices on the system bus, such as keyboard, display, read-only memory and printer.

In FIG. 1 the write strobe signal from the processor 10 is provided by a line 15 to the write strobe inputs 21, 22, 23 of the memory devices 11, 12, and 13 respectively. Memory device selection signals are provided by select lines 20 running from the address decoder 16 to "chip enable" inputs of the memory devices. For example, select lines 31, 32, and 33 provide respective select signals to corresponding chip enable inputs 41, 42, and 43 of the memory devices 11, 12, and 13, respectively.

A line 34 from address decoder 16 is indicative generally that the address decoder selects other memory devices than those shown explicitly in FIG. 1. Such memory devices typically include ROM (read-only memory), and memory-mapped input/output devices such as a keyboard, a display, a printer, and discrete input/output latches.

It will be noted that in the system of FIG. 1 the write strobe signal is provided to all memory devices, including 11, 12, and 13, whenever asserted on line 15 by the processor 10. If the processor 10 were misbehaving seriously (as distinguished from the case of a processor or other system component failing in a physical, permanent way) the processor 10 could provide addresses on the address bus 14 that were meaningful to the address decoder 16, enabling one or another of memory devices 11, 12, and 13 from time to time. If the write strobe signal of line 15 were asserted during one of the periods of enablement, the contents of some or all of the memory devices 11, 12, and 13 could be lost. In the case of a postage meter, the descending register contents could be lost, a matter of great concern for both the postal patron and the postal service.

Figure 2:
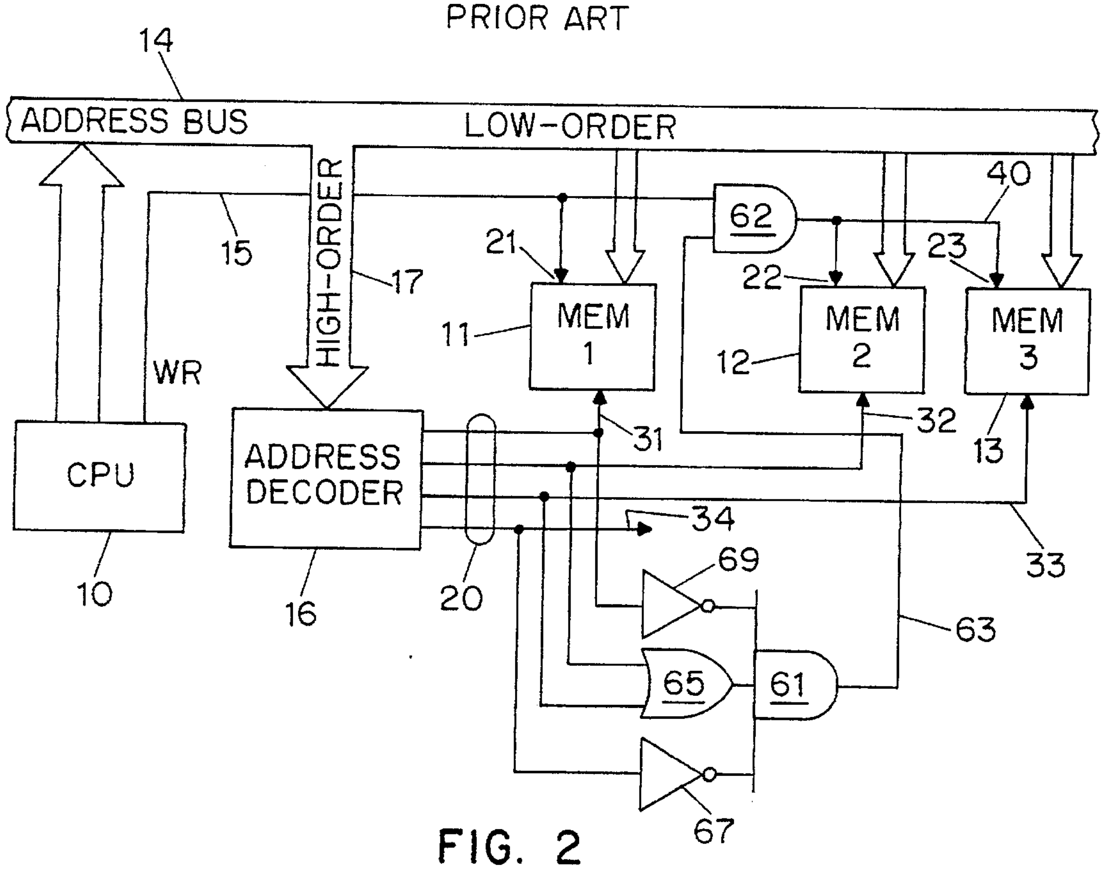
FIG. 2 PRIOR ART

FIG. 2 shows a known prior art system for enhancing the protection of selected memory devices, such as devices 12 and 13, here called "crucial" memory devices. Use of such a system might be prompted by the presence, in memory devices 12 and 13, of important postal data such as descending register data. In such a case memory devices 12 and 13 may be nonvolatile memories. While memory device 11 continues to receive the write strobe signal of line 15, just as in FIG. 1, it will be noted that the crucial memory devices 12 and 13 receive a gated signal 40 at respective write strobe inputs 22 and 23.

With further reference to FIG. 2, the selection outputs 20 of address decoder 16 are connected to respective memory devices as in FIG. 1. The system of FIG. 2 differs, however, in that the selection outputs 20 are also provided to multiple-input AND gate 61. The selection lines 32 and 33 for the crucial memory devices 12 and 13, respectively, are ORed at a gate 65 and provided directly to the AND gate 61. The remaining selection lines from the address decoder 16 are each inverted by inverters 67 and 69, as shown in FIG. 2, and provided to the AND gate 61. The address decoder 16 of FIG. 2 differs from many typical address decoders 16 such as shown in FIG. 1 in that every possible address of the high-order address bus 17 is decoded at one or another of the selection outputs 20. If necessary, a "none-of-the-above" selection output is provided to respond to addresses having no intended physical counterpart in the system design. The result is that the number of selection outputs 20 active at any given moment is exactly one, no more and no fewer.

It will be appreciated that the output 63 of AND gate 61 is high if (a) one of the crucial memory devices is selected and (b) none of the other memory devices is selected. Signal 63 is one of two inputs to AND gate 62; the other is the write strobe signal of line 15. The crucial memory devices, then, receive write strobe signals only when one or another of the crucial memory devices is currently being selected by the address decoder 16.

In the circumstances of a system suffering no mechanical defect, the system of FIG. 2 offers no protection of crucial data beyond that of FIG. 1. Assuming, for example, that the address decoder 16 and the address bus 14 and 17 are electrically intact, then the gates 61 and 62 have no effect. The gates 61 and 62 only serve to block write strobe inputs at 22 and 23 which would in any event be ignored by memory devices 12 and 13 because of the lack of asserted selection signals on lines 32 and 33. Stated differently, a processor 10 misbehaving seriously in a system of FIG. 2 that is electrically sound will be capable of destroying data in the crucial memory devices simply by presenting their addresses on the address bus 14. When the processor 10 presents a valid address on the address bus 14, the corresponding selection line, for example line 32, will be asserted and will be received at the chip-enable input 42 of memory device 12. Likewise, a strobe signal on line 40 will be made available to the write strobe input 22 of memory device 12. The possible result is loss or damage to the contents of memory device 12.

Figure 3:
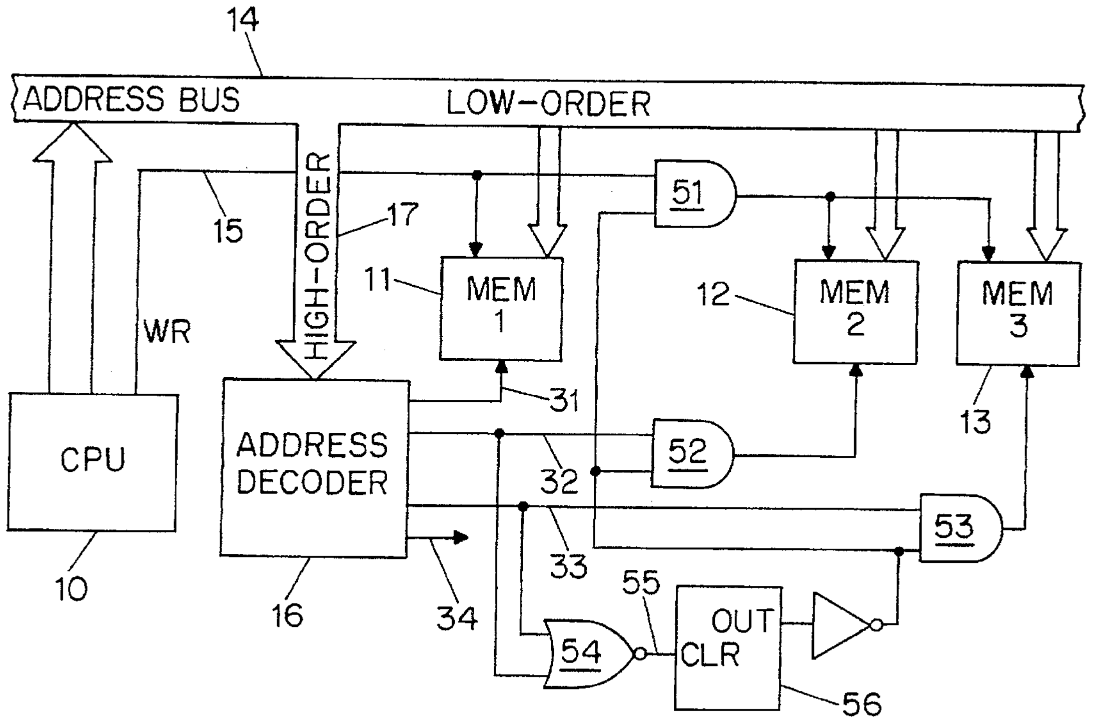
FIG. 3 PRIOR ART

FIG. 3 shows another prior-art system intended to protect data in crucial memory devices, say memory devices 12 and 13. In the system of FIG. 3, the processor 10, address bus 14 and 17, and address decoder 16 are as in FIG. 1. Memory device 11, which is not a crucial memory device, receives the write strobe signal of line 15 directly, as in FIG. 1, and receives its corresponding selection signal 31 directly, also as in FIG. 1.

Crucial memory devices 12 and 13, however, do not receive selection signals or the write strobe signal directly. Instead, AND gates 51, 52, and 53 are provided, blocking the selection signals 32 and 33 and the write strobe signal of line 15 under circumstances which will presently be described.

In the system of FIG. 3, the selection outputs for the crucial memory devices (here, selection signals 32 and 33) are provided to a NOR gate 54. Most of the time the processor 10 is not attempting access to the crucial memory devices 12 and 13, and so select signals 32 and 33 remain unasserted (here assumed to be a low logic level); as a result the output 55 of gate 54 is high. This clears counter 56.

At such time as the processor 10 attempts to read from or write to either of the crucial memory devices 12 or 13, a corresponding one of the selection lines 32 or 33 is asserted. Output 55 of gate 54 goes low, and counter 56 is able to begin counting.

Failure modes are possible in which an address line 32 or 33 may continue to be asserted for some lengthy period of time. For example, a mechanical defect in the address bus 14 and 17, in the address decoder 16, or in the wiring of lines 31, 32, 33, and 34, may give rise to continued selection of a crucial memory device 12 or 13. A consequence of such a mechanical defect could be a write instruction from the processor 10 that is intended for, say, memory device 11, but which, due to the mechanical malfunction, would cause a change in the contents of memory devices 12 or 13 as well.

Although as just described the system of FIG. 3 offers protection against certain mechanical failures, it provides only limited protection against the prospect of a processor misbehaving seriously. As will now be described, the system of FIG. 3 will fail to detect many of the possible ways a processor may misbehave, and will be successful at protecting against only a particular subset of the possible ways of misbehavior.

Those skilled in the art will appreciate that memory read and memory write instructions carried out on the system bus represent only a portion of all the bus activities. Prior to the processor's execution of an instruction forming part of the stored program, the processor must necessarily have fetched the instruction from a memory device on the system bus. From the point of view of an observer of the bus, the fetch activity is electrically very similar to a memory read activity, and each includes a step of the processor 10 providing an address on the system bus. The address decoder 16 handles memory read addresses the same way it handles fetch addresses. In a system functioning properly it is expected that the fetch addresses will represent retrieval of data (i.e. instructions for execution) only from locations that contain data, namely from the memory devices containing the stored program. In a system functioning properly it is also expected that fetching would never take place from locations containing data such as the descending register. In systems such as those discussed herein, where memory devices 12 and 13 are assumed to contain crucial data, it is expected that no fetching would take place from the memory devices 12 and 13. Indeed it would not be out of the ordinary for periods of time to pass in which fetches and memory accesses (either reading or writing) occurred on the system bus more or less in alternation.

Under the normal steps of a typical stored program (in a system having no mechanical defects) it is expected that processor 10, shortly after initiating bus access to an address giving rise to the assertion of selection lines 32 or 33, will proceed to bus access elsewhere in the address space of the processor. Such bus access elsewhere would reset the counter 56 and avert the decoupling of gates 51, 52, and 53.

As one example, the conventional fetching of instructions for execution may cause the address decoder to stop asserting selection lines 32 and 33 and to assert instead the selection line for some memory device containing stored program. This would be the usual process in a system lacking any mechanical defect. Thus, fetching (at least in a system that is free of mechanical defect) would generally keep the counter 56 reset more or less continuously, except in the special case of processor malfunction where the instruction pointer or program counter happened to point to a crucial memory.

It will be appreciated, then, that in the event of persistent assertion of one of the selection lines 32 or 33 due to a cause other than a mechanical defect, this would be expected to occur only if the processor happened to be fetching instructions for execution from the selected memory. Thus if the processor misbehaves seriously, and if it happens to be doing so while its instruction pointer or program counter is causing instructions (actually, data) to be fetched from the crucial data of one of the memories 12 and 13, the counter 56 would block access to the crucial memory device after the passage of a preset time interval.

In the more general case, however, of a processor misbehaving seriously with its instruction pointer or program counter causing instructions to be fetched from a memory device other than the crucial data, the counter 56 would be periodically cleared, bringing an end to any blocking of access (by gates 51, 52, and 53) to the crucial memory device. In summary, though the system of FIG. 3 protects against some mechanical failures, it does not comprehensively protect against the potential problem of a processor misbehaving seriously.

Figure 4:
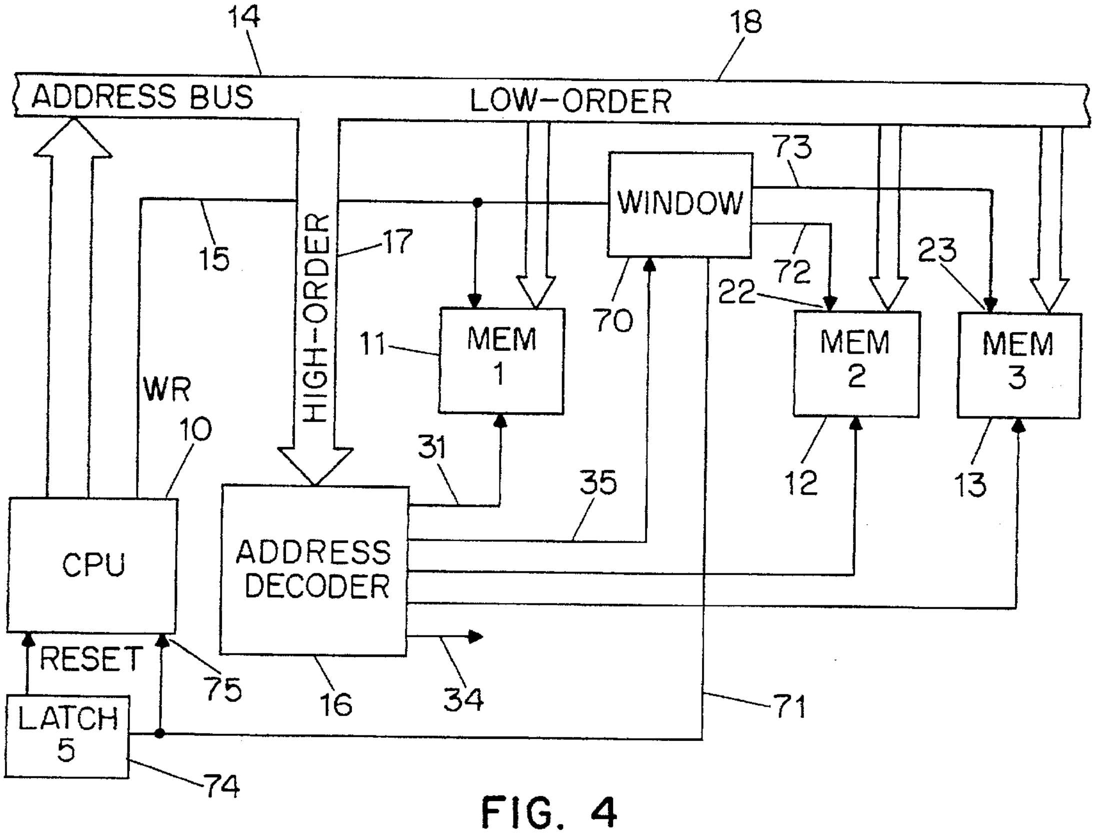
FIG. 4 PRIOR ART

FIG. 4 shows yet another prior art approach to the problem, namely the approach set forth in U.S. Pat. No. 5,276,844. Processor 10 provides address signals to the address bus 14 and to the address decoder 16, just as in the system of FIG. 1. The memory devices 11, 12, 13 all receive respective selection signals from the address decoder 16 just as in the system of FIG. 1. Memory device 11 receives the write strobe signal of line 15 as in the system of FIG. 1. Crucial memory devices 12 and 13, however, receive inputs at their write strobe inputs 22 and 23 not from line 15 but from a window circuit 70. Window circuit 70 receives requests from the processor 10 by I/O port transactions (which is preferable) or by I/O transactions. Herein, the term "addressable latch" will be used to mean either a latch that is addressable by the processor, for example a latch in the memory address space of the processor or a latch in the I/O address space of the processor. In the latter arrangement a selection signal 35 from address decoder 16 is provided to the window circuit 70, and preferably it also receives low-order address bits from low-order address bus 18.

Figure 5:
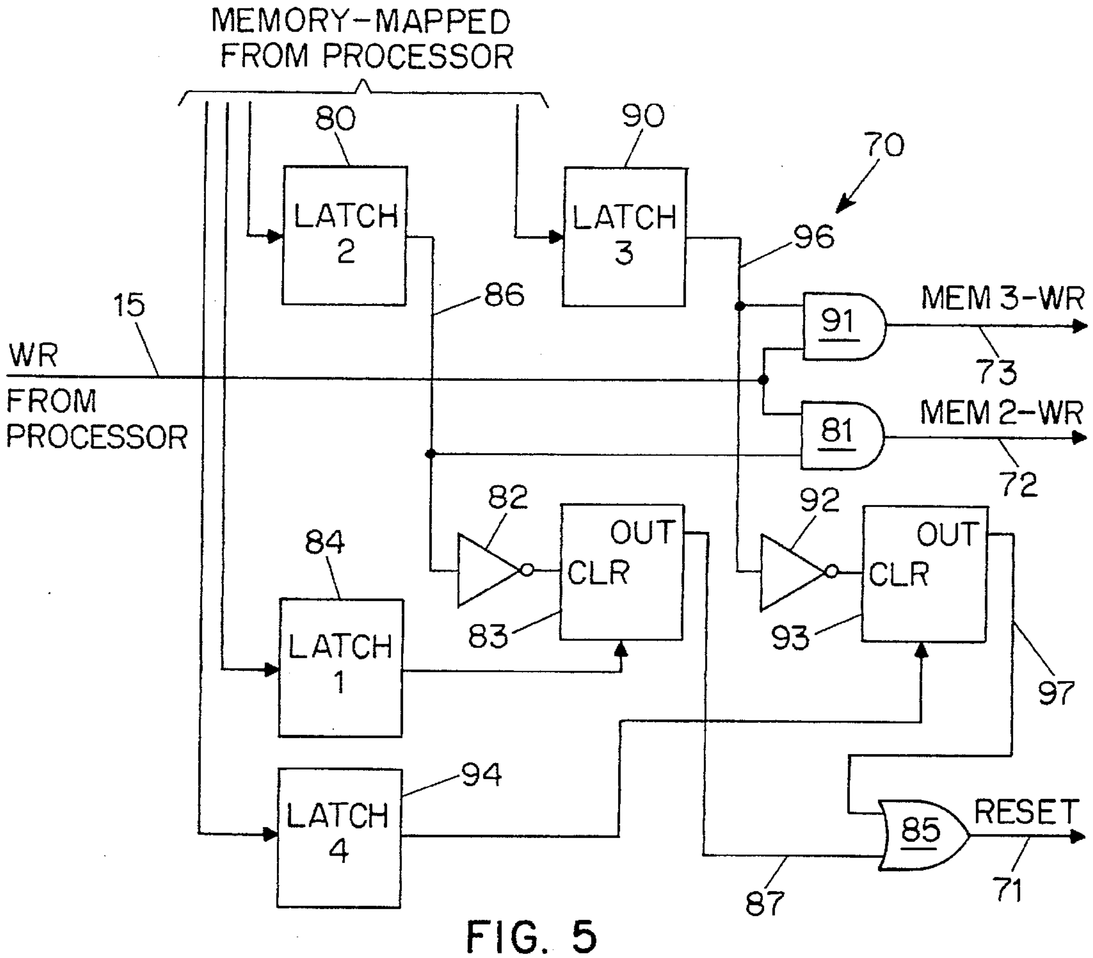
FIG. 5 PRIOR ART
FIG. 5 is a functional block diagram of the window circuit of FIG. 4.

In FIG. 5, depicting the prior art window circuit 70 of U.S. Pat. No. 5,276,844, an output 86 of latch 80 is normally low. The normally-low state of line 86 turns off an AND gate 81 so that a write strobe signal 72 for the memory 12 is unasserted. With the line 86 low, the write strobe signal of line 15 does not have any effect on the output 72 of the window circuit 70. For similar reasons an output 73 is also unasserted. The normally-low state of line 96 turns off an AND gate 91 so that a write strobe signal 73 for the memory 13 is unasserted.

When line 86 and a corresponding line 96 are both low, which is typically most of the time, a pair of counters 83, 93 are continuously cleared. Outputs 87 and 97 of the counters 83, 93 are thus both low, so that an OR gate 85 has a low output 71. The processor 10 receives the unasserted signal 71 at its reset input 75, so is permitted to continue normal execution of the stored program.

Under control of the stored program the processor 10 gains write access to crucial memory devices 12 or 13 as follows. Referring now to FIG. 5, to write to memory device 12 the processor writes a command to the latch 80 representative of a request for access. The output 86 of latch 80 goes high, turning on the gate 81 and permitting write strobe signals of the line 15 to be communicated to the output 72 of the window circuit, and thence to the write strobe input of memory device 12. The high level of line 86 causes an inverter 82 to go low, removing the clear input to the counter 83. Counter 83 commences counting, and if it reaches a preset threshold its output 87 goes high, turning on OR gate 85. This resets the processor 10. The preset threshold of counter 83 is changeable by commands to a latch 84 from the processor. In the normal course of execution of a stored program, typically the processor 10 would write a second command to latch 80 shortly after making its accesses to memory device 12, causing the output 86 of latch 80 to return to its normal, low state. This would reset the counter 83 and avert any resetting of the processor 10.

Similarly, if the processor 10 writes a command (called a setting signal) to a latch 90 to turn on the line 96, write access to the memory device 13 will be possible, the output of inverter 92 will go low, and the clock 93 will begin counting. In the normal course of events typically the processor 10 would fairly promptly write a second command (called a clearing signal) to latch 90, cutting off the write strobe signal to device 13 and clearing the counter 93. The counter 93 is programmable by commands to a latch 94. As a consequence, each of the counters is individually programmable. It will be appreciated that latches 80, 84, 90, and 94 which form part of window circuit 70 may be memory-mapped latches or latches in I/O address space.

Returning now to prior art FIG. 4, the reset signal 71 may be seen which, if asserted, causes a reset to the processor 10 at its reset input 75. Generally this could be any hardware interrupt to the processor 10, but preferably it is the reset input, which may be thought of as the highest priority hardware interrupt. The reset input causes program execution from the instruction at a fixed memory location (zero in some processors, or FFF0 in other processors, for example), thus eliminating any possible problem with spurious contents of the instruction pointer or program counter. The reset input also resets all other internal states of the processor 10, thus eliminating any possible problem with spurious internal states of the processor 10. Where the condition giving rise to one or another of the counters 83, 93 reaching its threshold was a processor misbehaving seriously, then, there is the possibility the processor will execute its stored program correctly thereafter.

Continuing with a discussion of the prior art, preferably a latch 74 is provided, external to the processor 10 and capable of latching the reset signal 71. The stored program for processor 10 preferably has steps that check, upon execution starting at zero, to see whether the latch 74 is set. If it is not, the assumption is that the execution from zero was due to initial application of power. If latch 74 is set, the assumption is that execution from zero was due to a reset from the window circuit 70, and the processor can appropriately note the event. Repeated notations of a reset due to the window circuit 70 will preferably cause the processor 10, under stored program control, to annunciate an appropriate warning message to the user.

The prior art system of FIGS. 4 and 5 offers some improvement over the systems of prior art FIGS. 1, 2, and 3, but as mentioned above it is desirable that further improvements be provided. For example, each of the systems of FIGS. 1, 2, 3, and 4 protects only entire memory chips such as memories 12 and 13. Thus for some of the memory available to the processor to be protected in this way, while other memory available to the processor would continue to be available in the ordinary way, it is necessary to have at least two memory devices, each with its own control lines that are capable of being selectively activated.

One considering the problem for the first time, faced with the issue of trying to avoid having to provide at least two chips (one of which is protected and one of which is not) might wonder if a reduction of the chip count to one memory chip could be facilitated by the simple step of having only one chip and protecting the chip with a window circuit such as in the prior art. But "protected" in this context means that memory access may only occur of the processor generates an appropriate access request prior to making access to the protected memory. But the bus transactions that take place, for example, during an instruction fetch, are incapable of having access requests interposed with the bus cycles of the fetch. Stated differently, one cannot have the program memory be "protected memory" in the sense used here.

Yet another issue is that any bus transaction to a protected memory address is necessarily a rather slow transaction, since it is preceded by an access request and is followed with a clearing of the access request. This consumes substantial bus bandwidth, a penalty which would be undesirable for most memory read and write cycles. It is desirable that the time-consuming access requests and clearing of access requests be incurred only when absolutely necessary. In a postage meter, for example, one would wish to incur those time-consuming activities only when updating crucial portions of memory such as those containing the descending register.

For all these reasons there is little choice but to have at least some memory that is not "protected" in the sense used here, and yet it is assumed to be desirable to have some protected memory. With all known prior art memory protection systems this would require, as suggested above, at least two memory chips, at least one of which is protected and at least one of which is not.

The system according to the present invention, as will now be described, provides sophisticated protection of critical memory information even if only a single memory device is used in the system, where part of the device is protected and part is not. Furthermore it permits the design of the system to be such that at power-up, a particular portion of the single memory device is protected, and yet under processor control it is possible to protect a larger portion of the device that is less than all of the device.

Figure 13:
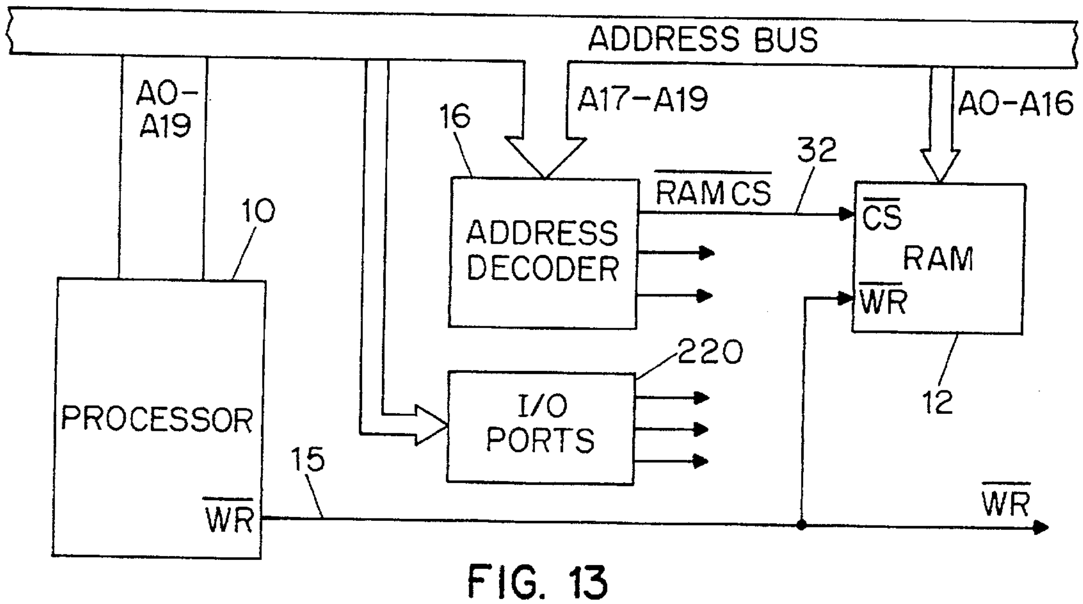
FIG. 13 PRIOR ART
FIG. 13 is a functional block diagram of a prior art memory addressing system showing what the system of FIG. 7 would look like without the window system according to the invention.

To portray the memory protection system according to the invention, it is helpful first to describe the memory access signals of a memory addressing system of the general type being protected. Turning to FIG. 13, there is shown a prior art functional block diagram showing a typical memory addressing system that does not contain a protection circuit in keeping with the invention. Processor 10 provides address lines to an address bus. Here the address lines are numbered A0 through A19, although it will be appreciated that the total number of address lines plays no part in the invention but is simply determined by the choice of processor and other system considerations. Write strobe signal WR* 15, which in this embodiment is active low, controls writing to a RAM memory 12 and other devices omitted for clarity in FIG. 13. (Active-low signals are indicated here with an asterisk, and are indicated in the figures with a bar over the label.) Other control signals, such as signals defining reading and I/O bus transfers, are omitted for clarity in FIG. 13. I/O input and output ports are made available to the processor through I/O port circuitry 220. An address decoder 16 of conventional design decodes high-order address lines (here, lines A17–A19) to generate a number of address selection signals including a RAM chip-select signal RAMCS* 32. Here the chip-select signals are assumed to be active low. As will be appreciated a write operation upon memory 12 requires assertion of both the write signal 15 and the select signal 32, and the contents of the low-order portion of the bus (here, lines A0–A16) determine which address within the RAM is being written to. In this system the processor 10 can write arbitrarily to any address of RAM 12.

Figure 6:
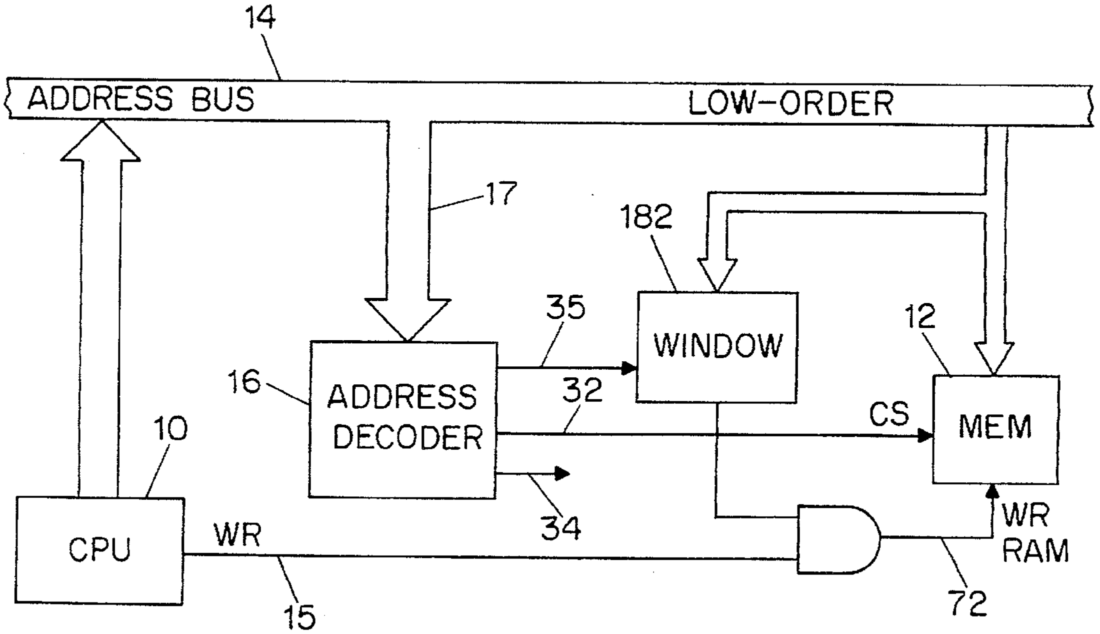
FIG. 6 is a functional block diagram of a memory addressing system according to the invention, including a window circuit.

Turning now to FIG. 6 there is shown a computer system in accordance with the invention. Processor 10 is connected by a parallel bus to numerous devices in the system, including the memory device 12 and other devices omitted for clarity, such as keyboard, display, and numerous discrete inputs and outputs to control the postage printing means. For clarity not all of the parallel bus is shown. Address bus 14 is shown, providing a high-order portion 17 of the address bus to the address decoder 16 much as in prior-art systems and a lower-order portion of the address bus to other devices such as memory 12. The processor provides a control line 15 which is a write strobe signal, and which in a prior art system such as that of FIG. 1 would be provided directly to write-strobe inputs of devices such as device 12. One of the outputs of address decoder 16 is a selection signal 32 which is indicative of the processor having selected an address in the range defined to be within memory device 12. Another of the outputs 35 is defined as a request signal from the processor 10 whereby the processor requests access to a protected portion of the memory 12. Line 34 represents generally the other memory addresses or I/O addresses which might be selected by the address decoder 16, for selection of the keyboard, display, or other devices.

In this embodiment the selective denying of access to the memory 12 is accomplished by selectively blocking the write strobe signal. (As will be apparent the selective denying of access could also be accomplished by selectively blocking the selection signal to the memory device 12.) The window circuit 182, again referring to FIG. 6, monitors the addresses presented at the low-order portion of the address bus, and if the address presented is within the protected range, the window circuit 182 permits the control signal to reach the memory device 12 only if the request signal 35 has already been presented.

Figure 7:
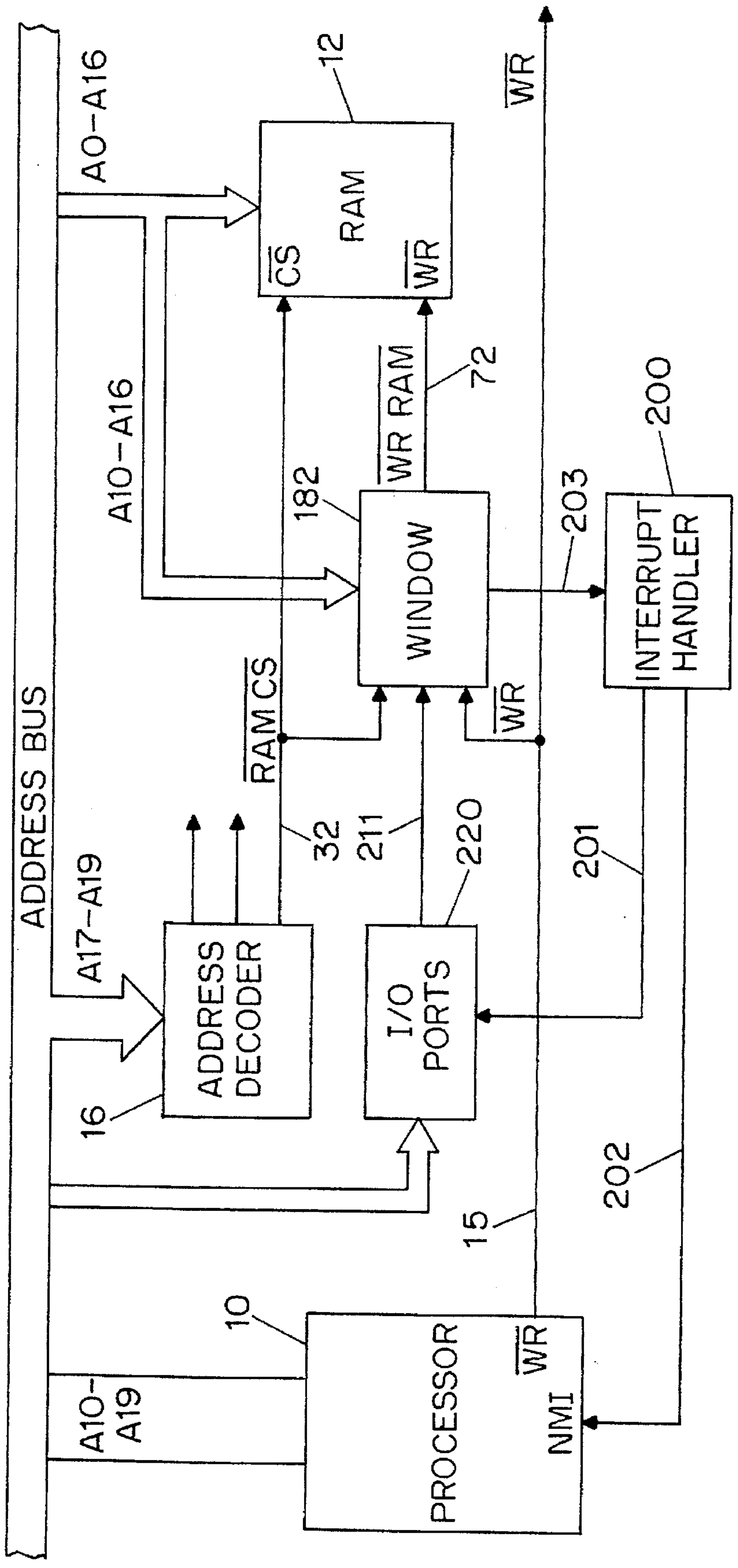
FIG. 7 is a functional block diagram of a memory addressing system according to another embodiment of the invention.

FIG. 7 shows another of several embodiments of the invention. FIG. 7 shows an annunciation line 203, a non-maskable interrupt input 202 to the processor, and an interrupt handler 200. This additional circuitry is somewhat like that in the system of U.S. Pat. No. 5,276,844 and shown as latch 74 in FIG. 4, similar in that an annunciation is made of certain erroneous activation of the window circuit 182 by the processor 10. The annunciation signal 202 interrupts the processor and depending on the reason for the interrupt, normal system function is restored. What's more, software is able to determine, upon execution of its non-maskable-interrupt (NMI) startup routine, why it has been interrupted. If the interrupt is due to the annunciation line 202 then software can log the event which may be helpful in later diagnostic testing.

Those skilled in the art will appreciate that design factors may favor having the annunciation effect a reset or an interrupt, and that each choice comports with the invention. The following discussion uses the term interrupt but it should be understood that the term is collective and includes the term reset except where context indicates otherwise.

Figure 11:
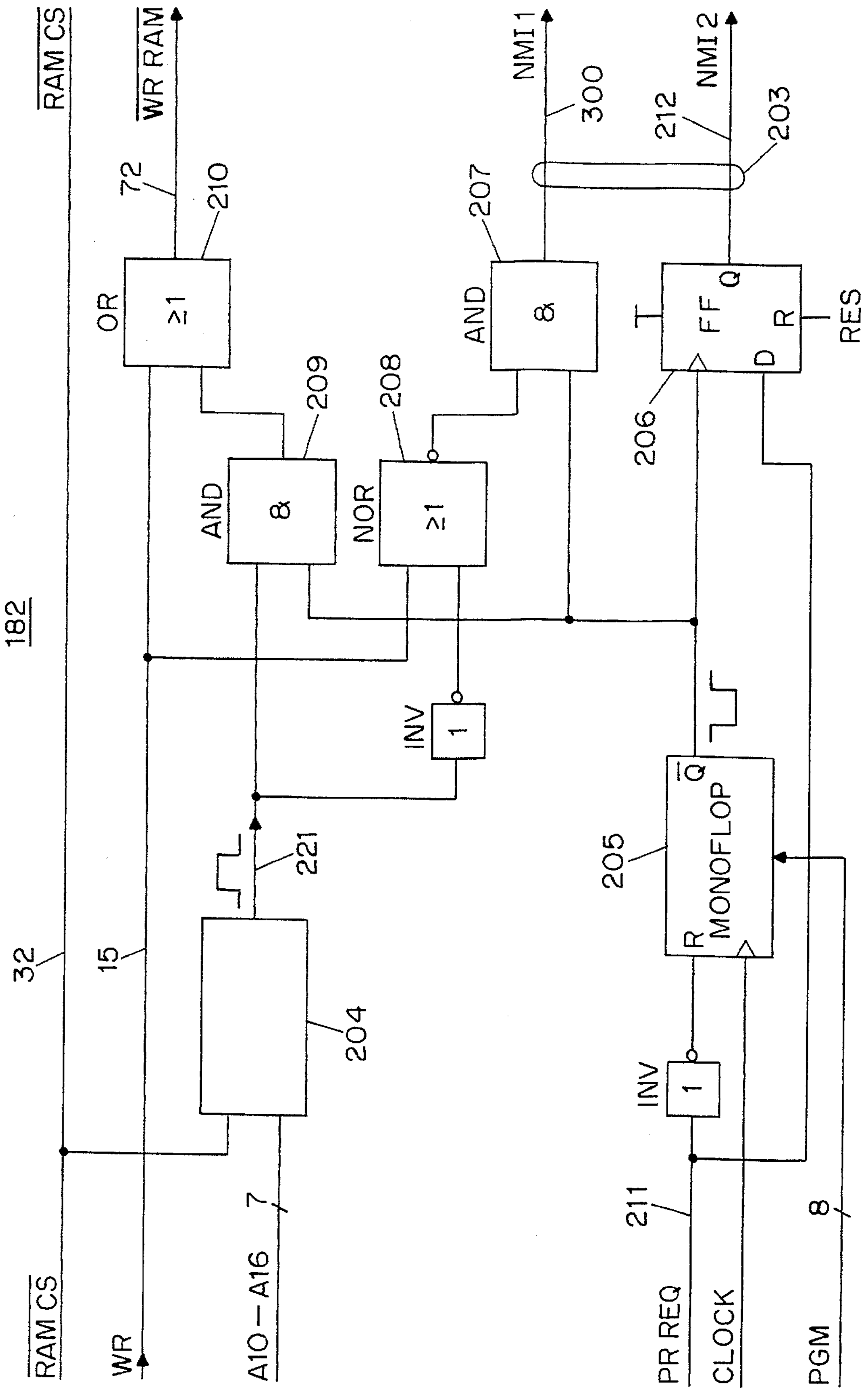
FIG. 11 is a schematic diagram of the window circuit as used in the embodiment of FIG. 7.

The window circuit 182 of FIG. 7 will now be described in some detail. Turning now to FIG. 11, the inputs are as follows. RAMCS* is an active-low signal from the address decoder, indicating that an address within the range defined for the RAM chip 12 has been selected by the processor on the address bus. WR* is an active-low signal that is asserted whenever the CPU is writing (or, in the context of this application, attempting to write) to some location in memory address space. A10–A16 are address lines. PRREQ is a line permitting the processor 10 to request access to a protected region of the RAM chip 12. CLOCK is a system clock. PGM is a set of eight lines permitting the processor 10 to program a programmable monostable flip-flop 205.

The outputs are as follows. Output RAMCS* is the same as the above-mentioned RAMCS* input. WRRAM* is an active-low write strobe signal that is selectively enabled by the window circuit so as to effect the protection of a portion of the RAM chip 12. NMI1 and NMI2 are nonmaskable interrupt signals provided to the processor by circuitry shown in FIG. 12.

Box 204 is a programmable address decoder which receives the address lines A10–A16 and the RAMCS* signal and generates an active-high signal of line 221 if the address selected is within a predefined protected range of addresses.

The monoflop 205 is a programmable monostable flip-flop. When PRREQ is asserted, then the reset input to the monoflop goes low, and it emits at its output Q* an active-low signal of a duration that is controlled by the PGM inputs.

The major components having been described, the function of the window circuit will now be characterized with respect to a number of initial conditions and events. If the address selected by the processor is in the non-protected portion of the RAM 12, then the output 221 is low, turning off gate 209. As a result, the WR* signal 15 is propagated directly to the WRRAM* signal 72. Write access to the RAM 12 is normal. The state of line 221 also turns on gate 208, turning off gate 207 and ensuring that NMI1 is not asserted.

Suppose the address selected by the processor is in the protected portion of the RAM 12, and suppose further that the processor did not previously request access to that portion of the RAM 12, that is, that PRREQ has not been asserted. Then gate 205 has a high output (because PRREQ has not been asserted) and line 221 has a high output (because the address at A10–A16 was in the protected range of addresses, and the address at A17–A19 must have been in that range as well since RAMCS* will have been selected by decoder 16 (FIG. 7). This means gate 209 is on, so that gate 210 is off. Signal WRRAM* never gets asserted, so the contents of RAM 12 are not in jeopardy.

Now suppose that in addition to the above conditions (the address bus contains an address in the protected region and PRREQ has not been asserted) one more thing happens, namely the processor asserts WR*. In plain language, the processor has attempted to write to a protected address in the RAM 12 without asking permission in advance. Then gate 208 is turned off. The output of the monoflop 205 will be high, so gate 207 is turned on. The NMI1 300 output is asserted. It will thus be appreciated that NMI1 represents the event of the processor having attempted to write to the protected region of RAM 12 without having asked permission in advance.

The normal sequence for access to the protected region of RAM 12 is as follows:

A. PRREQ is asserted.

B. the processor writes to an address in the protected region of RAM 12, all within a predetermined time interval.

C. PRREQ is de-asserted, also within the predetermined time interval.

The predetermined interval is set by the programming of the monoflop 205 as will be discussed further below. The clock rate of the CLOCK signal (see FIG. 11) is selected so that, depending on the PGM signals (see FIG. 11), the predetermined interval is from 0.5 μsec to 138 μsec. PRREQ is preferably a particular output port of the I/O space of the processor 10.

Now consider what happens if the processor 10 requests permission before writing to the protected region of RAM 12. First the processor asserts PRREQ 211 so that the monoflop 205 has an active-low output which lasts for the predetermined interval. This turns off gate 209 which permits gate 210 to propagate the WR* signal to the WRRAM* line; in plain language write access to the RAM 12 is enabled for as long as the output of monoflop 205 remains asserted. The active-low output of monoflop 205 also turns off gate 207, so that NMI1 is not generated.

It will be recalled that the normal sequence is for the processor to de-assert PRREQ within the predetermined interval of asserting PRREQ. If this happens, then the rising edge at the output of gate 205 clocks data into flip-flop 206, and the data is low (because signal PRREQ is low). The output of gate 206 remains unchanged and low.

On the other hand, if the processor fails to de-assert PRREQ in time, then the rising edge at the output of gate 205 clocks data into flip-flop 206, and the data is high (because signal PRREQ continues to be high). The output of gate 206 goes high. The result is that NMI2 is asserted, which is indicative of the processor having failed to de-assert PRREQ soon enough.

Still more could go wrong with a misbehaving processor. For example, after the elapsing of the interval of the monoflop 205, the processor could try to write to protected RAM (violating step B above). This would result in assertion of NMI1 in addition to the assertion of NMI2 due to the processor's failure to de-assert PRREQ soon enough.

It will be appreciated that the signals NMI1 and NMI2 each represent a processor 10 behaving incorrectly, and in each case the misbehavior is of great concern. NMI1 indicates the processor 10 failed to ask permission before attempting a write to protected RAM, and NMI2 indicates the processor failed to de-assert PRREQ soon enough.

The embodiment including FIG. 11 offers advantages over the system of U.S. Pat. No. 5,276,844. For example, it offers two items of data to the processor via the NMI1 and NMI2 signals, while the prior art system only offers one such item of data. The system according to the invention will both block and annunciate unauthorized attempts to write to protected RAM, while the system of the prior art only blocks such access. The system of the invention allows both protected and unprotected addresses within a single memory device; the prior art requires separate memory devices. As will be discussed further below, the system of the invention permits one-time updating of the address range being protected, while the prior art does not.

Figure 8:
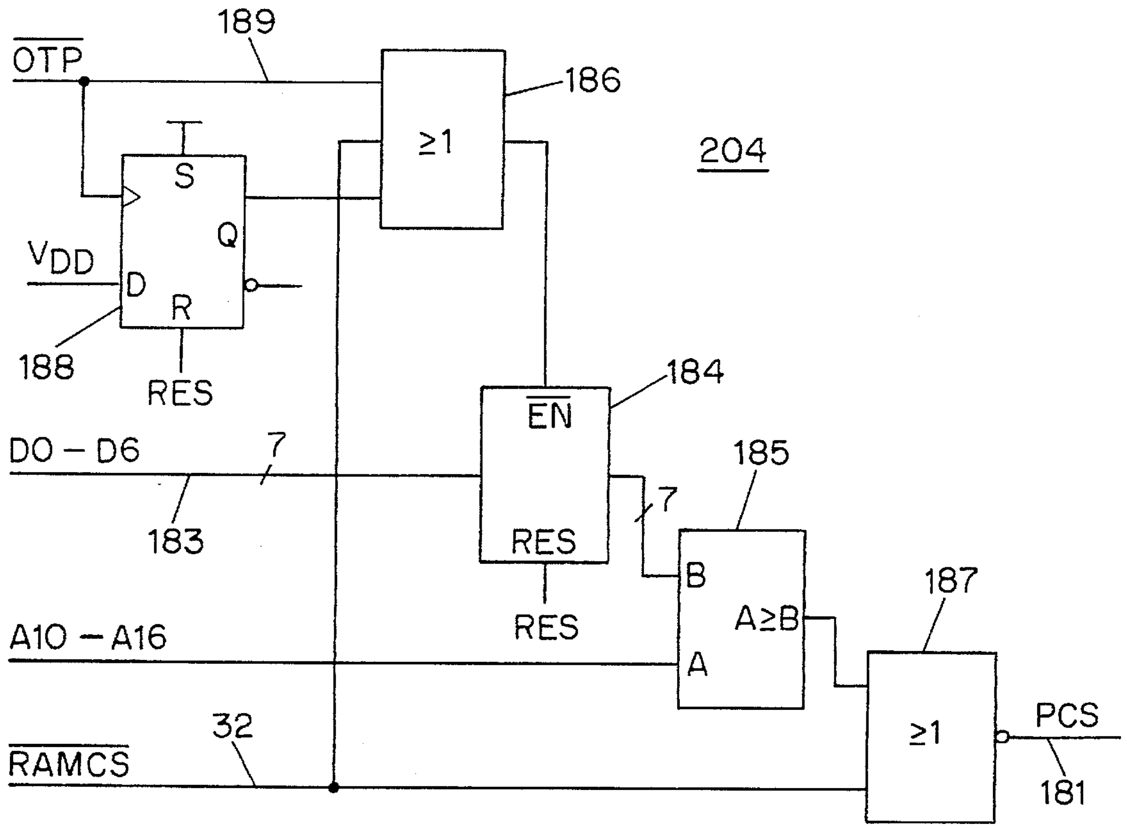
FIG. 8 shows a programmable address decoder such as is used in the system of FIG. 11.

Reference was made to box 204, which is a programmable address decoder which receives the address lines A10–A16 and the RAMCS* signal and generates an active-high signal of line 221 if the address selected is within a predefined protected range of addresses. A preferable embodiment for box 204 is detailed in FIG. 8. In FIG. 8, gate 187 combines two signals—one from comparator 185 which is indicative of whether or not the address presently being presented on the address bus (lines A10–A16 in this system) falls within the protected range, and a second signal (RAMCS, line 32) which is a chip-select signal for the RAM 12 chip which has been defined to have a protected area.

Upon system hardware reset the latch 184 starts with a predetermined initial state, which defines the protected region of memory. The contents of the latch 184 are compared with the address lines A10–A16 in comparator 185. Preferably a provision is made in hardware for processor modification of the contents of latch 184, through assertion of the one-time-programming line 189 (OTP). Line 189, when asserted for the first time by the processor 10, clocks data from the data lines D0–D6 183 of the parallel processor bus into the latch 184. Desirably the hardware 184, 185 is set up so that the only possible effect of loading new data into latch 184 is the expansion of the protected range, not the reduction or elimination of the protected range.

Flip-flop 188 and gate 186 are provided so that it is only possible for the processor to reload latch 184 one time. Only upon a hardware reset is flip-flop 188 in a state that permits enabling of latch 184.

For clarity the connection between OTP line 189 and the processor is not shown in FIG. 8, but is preferably a discrete output associated with selection of either an I/O port or a memory—mapped I/O address. Likewise for clarity the data lines 183 and the latch-reprogramming signal 189 (FIG. 8) are not shown in system FIGS. 6 and 7.

It should be appreciated that while the embodiment is shown with the highest addresses being protected, such as the topmost 1K of the memory device, there is nothing about the system that requires the protected memory to be at one end or the other of the address space of the memory device 12. It simply happens that the circuitry of the programmable address decoder 204 (FIG. 8) is simplest if the protected area is at one end of the address space of the device, so that only one comparator 185 is needed. If the RAM device 12 is defined to start at address 0000H, then once the design decision is made to establish a protected range at one end or the other of the address space of the memory device, it is clearly preferable to protect the high end, because the low end is where execution begins at power-up of the processor or when it is reset; fetching for program execution will surely take place at address 0000H making it undesirable to include 0000H in the protected range of addresses.

Those skilled in the art will appreciate that without departing from the invention in any way, the protected space could be in the middle of the address space of the memory device 12, for example by employing two comparators 185 to detect the upper and lower boundaries of the protected range of addresses.

It will also be appreciated by those skilled in the art that while the invention is described in an embodiment in which the window circuit denies access to the memory device by blocking its write strobe signal, nothing about the invention requires that that particular control signal be blocked to protect the protected range of memory. For example, the protection of the protected range could be accomplished by blocking the chip-select line of the protected memory device rather than blocking the write strobe. Alternatively the window circuit could block both of the control signals (write strobe and chip select) when unauthorized access to the protected range of addresses is attempted. In general terms it may be said that the invention calls for selectively denying at least one of the control signals of the memory device in the event that an address in the protected range is presented in the absence of a request signal, where the protected range is defined to be less than the entirety of the address space of the memory device.

Those skilled in the art will also appreciate that while the invention is shown with separate address decoder 16 and window circuit 182 in FIGS. 6 and 7, preferably the two functional elements are provided by a single application-specific integrated circuit (ASIC) containing appropriate circuitry.

Recall that in FIG. 7 there is shown an interrupt handler 200.

Figure 12:
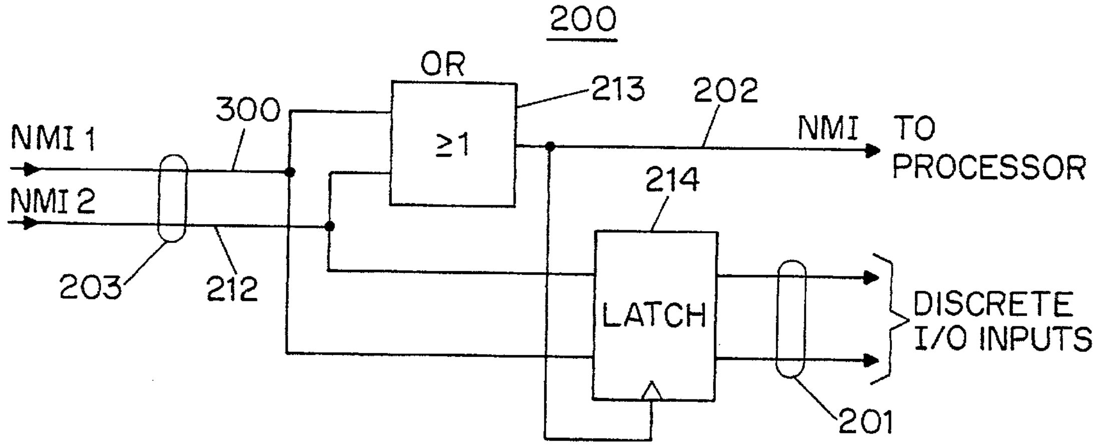
FIG. 12 is a schematic diagram of the interrupt handler circuit as used in the embodiment of FIG. 7.

The interrupt handler 200 is shown in more detail in FIG. 12. The two nonmaskable interrupt signals NMI1 and NMI2 are combined in gate 213 and provided as a nonmaskable interrupt to the processor 10. In addition they gate a latch 214, which stores the state of lines NMI1 and NMI2 to be presented as discrete input ports of the I/O space of the processor 10. As a result, the interrupt handling routine of the processor can determine whether the interrupt happened because of one or the other or both of the NMI1 and NMI2 signals. This is helpful both in the software design of the postage meter but also in subsequent diagnostic activity.

Figure 9:
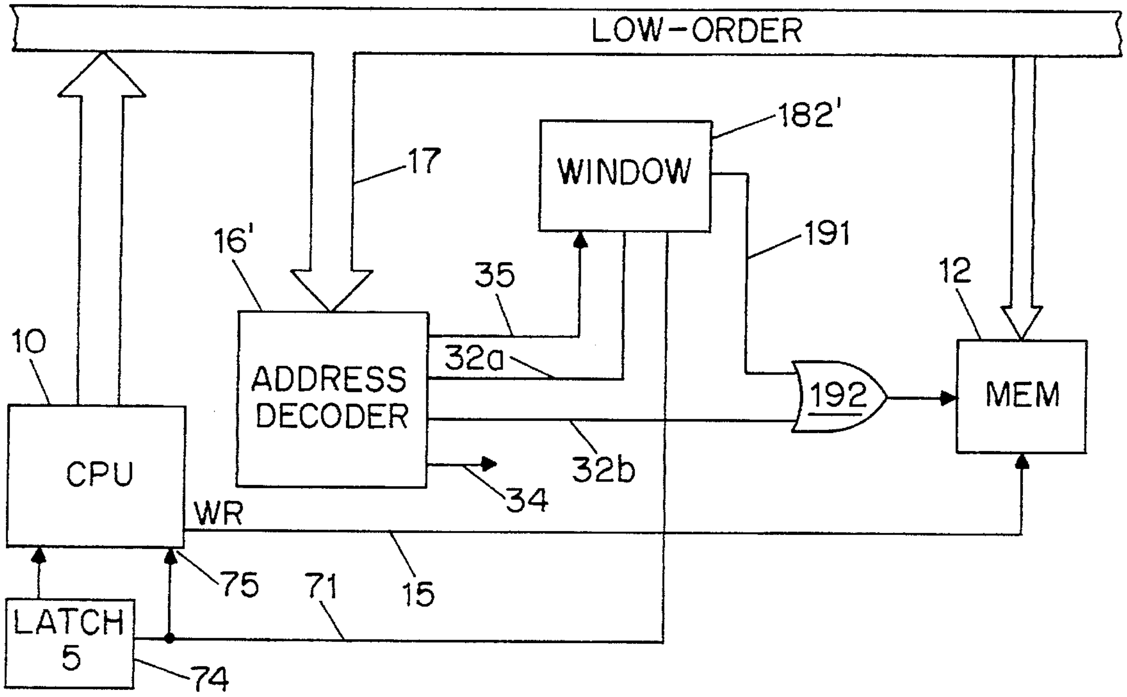
FIG. 9 is a functional block diagram of an alternative embodiment of the invention.
Figure 10:
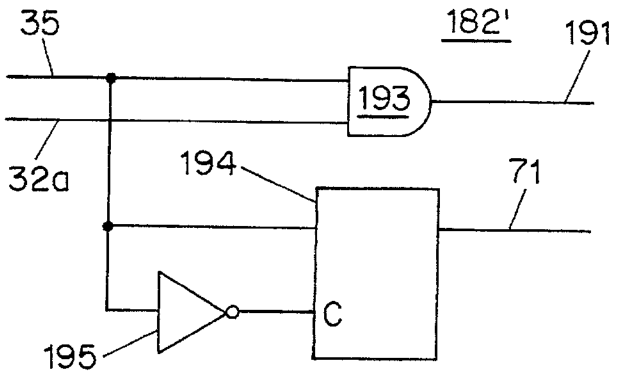
FIG. 10 is a schematic diagram of a window circuit as used in the embodiment of FIG. 9.

Those skilled in the art will appreciate that while it is preferred to have a system in which the window circuit is a separate functional unit from the address decoder (even though both are in a single ASIC), many of the benefits of the invention would be available even without that functional separation. As shown in FIG. 9, the function of the comparator 185 (FIG. 8) could be incorporated into the address decoder 16' (FIG. 9). In this alternative embodiment, the address decoder would have two outputs **32*a* and 32*b*, one or the other of which is asserted whenever an address in the range covered by the memory device 12 is addressed. Output 32*a* would be asserted when the address falls within the protected range, and output 32*b* would be asserted otherwise. In such an arrangement the circuitry of the window circuit 182' (FIG. 9) could be much simpler, as shown in FIG. 10. Selection line 32*a* would be passed on via gate 193 only if request signal 35 is asserted, on line 191. Line 191, as shown in FIG. 9, is recombined with selection line 32*b* in gate 192, the output of which selects memory device 12. In this embodiment the write signal 15 passes directly to the memory device 12 rather than being selectively denied by the window circuit. This may be seen as yet another illustration of the invention's general applicability to denying a control line (which may be a write strobe or may be a selection line) when an attempt is made to gain access to a protected portion of the memory in the absence of a duly presented request signal. Gate 194 is a programmable timer that generates an output 71 if signal 35** remains asserted for too long.

The arrangement of FIGS. 9 and 10, while indicative of an embodiment of the invention, is considered less preferable than the embodiment of FIGS. 7 and 11. For example, it needlessly blocks read access, where the only actions that really need to be blocked are write access. It does not provide two different annunciations NMI1 and NMI2. It continues to permit access even after the predetermined interval defined by clock 194 has passed. Nonetheless it does illustrate the invention in that access to a protected region of a single memory device is permitted only if a request is made in advance.

It should also be appreciated that in a simple system there might be no address decoder 16 for memory addresses, but only a decoder for I/O addresses. In such a simple system the memory device 12 might be the only memory device in the memory address space of the processor. In that case the window circuit 182 could selectively deny either the selection line of the device 12 or the write-strobe line, either of which is a control input to the memory device 12.

From the foregoing it will be appreciated that what has been provided is a sophisticated memory protection system the protects a selected portion of memory against many failures including a processor running amok, without the need for multiple memory devices some of which are protected and some of which are not. In addition what has been provided is a way for the size of the protected area to be expanded under software control on a one-time basis.

While the above is a description of the invention in its preferred embodiment, various modifications, alternate constructions, and equivalents may be employed. Therefore, the above description and illustration should not be taken as limiting the scope of the invention, which is defined by the appended claims.

We claim:

1. A computer system for protecting memory comprising a processor having address outputs and executing a stored program, a memory having a control input, and window means, said window means comprising:

range detection means responsive to the address outputs for generating a range-detection signal indicative of an address from the processor being within a protected range, the protected range non-identical to the entirety of the space of addresses within the memory;

request means responsive to an output from the processor for recognizing a request from the processor and generating a request signal; and denying means intermediate the processor and the memory and responsive to the range-detection signal and the request signal for denying the control input to the memory if the range-detection signal is asserted in the absence of the request signal.

2. The computer system of claim 1 wherein the computer system further comprises a postage printer, and wherein the memory contains information indicative of an amount of postage available for printing.

3. The computer system of claim 1 wherein the range detection means further comprises means responsive to receiving a command from the processor indicative of a different range for setting the protected range to the different range.

4. The computer system of claim 3 wherein the request means comprises a first addressable latch, and the command from the processor indicative of a different range comprises a processor write command of a data value to the first addressable latch.

5. The computer system of claim 3 wherein the window means further comprises a second latch means responsive to the command from the processor indicative of the different range for blocking subsequent changes to the protected range.

6. The computer system of claim 5 wherein the request means comprises a first addressable latch, and the command from the processor indicative of a different range comprises a processor write command of a data value to the first addressable latch, and wherein the second latch means comprises a second latch that is reset upon system reset and is set by the processor write command of the data value to the first addressable latch, and wherein the set output of the second latch blocks subsequent writing to the first addressable latch.

7. The computer system of claim 1 further comprising a timing means responsive to the assertion of the request signal and responsive to de-assertion of the request signal, for generating an annunciation output upon the event of the request signal not being de-asserted within a predetermined interval relative to the assertion of the request signal.

8. The computer system of claim 7 wherein the processor further comprises an interrupt input, and wherein the annunciation output of the timer means is operatively coupled to the interrupt input.

9. The computer system of claim 8 further comprising event storage means responsive to receipt of the interrupt signal for storing information indicative of occurrence of the reset signal, the contents of said event storage means available as an input to the processor.

10. The computer system of claim 6 further comprising means permitting the processor to change the predetermined value.

11. The computer system of claim 1 wherein the processor further comprises a write control signal, and wherein the system further comprising means responsive to the denying means for annunciating the event of assertion of the range-detection signal and assertion of the write control signal in the absence of the request signal.

12. A method for protecting memory for use in a computer system comprising a processor having address outputs and executing a stored program, a memory having a control input, and window means, said window means comprising: range detection means responsive to the address outputs for generating a range-detection signal indicative of an address from the processor being within a protected range, the protected range non-identical to the entirety of the space of addresses within the memory; request means responsive to an output from the processor for recognizing a request from the processor and generating a request signal; and denying means intermediate the processor and the memory and responsive to the range-detection signal and the request signal for denying the control input to the memory if the range-detection signal is asserted in the absence of the request signal; the method comprising the steps of:

receiving address outputs from the processor at the range detection means;

generating the range-detection signal if the address outputs from the processor are indicative of the address from the processor being within the protected range; and denying the control input to the memory if the range-detection signal is asserted in the absence of assertion of the request signal.

13. The method of claim 12 wherein the window means further comprises a timing means, the method further comprising the steps of:

starting the timing means upon assertion of the request signal;

and providing an annunciation if the timing means has measured a predetermined interval prior to the request signal no longer being asserted.

14. The method of claim 13 wherein the step of providing the annunciation comprises interrupting the processor.

15. The method of claim 14 wherein the system further comprises event storage means responsive to receipt of the interrupt signal for storing information indicative of occurrence of the interrupt signal, the contents of said event storage means available as an input to the processor, the method further comprising the step, following the interrupting of the processor, of receiving an input from the event storage means.

16. The method of claim 13 wherein the step of providing the annunciation further comprises denying the control input to the memory.

17. The method of claim 12 wherein the denying step further comprises providing an annunciation.

18. The method of claim 17 wherein the step of providing the annunciation comprises interrupting the processor.

19. The method of claim 18 wherein the system further comprises event storage means responsive to receipt of the interrupt signal for storing information indicative of occurrence of the interrupt signal, the contents of said event storage means available as an input to the processor, the method further comprising the step, following the interrupting of the processor, of receiving an input from the event storage means.

* * * * *